United States Patent
Kiessle et al.

(10) Patent No.: US 10,430,259 B2
(45) Date of Patent: Oct. 1, 2019

(54) DATA OBJECT VALIDATION USING MULTILAYER COMPUTING ENVIRONMENTS

(71) Applicant: SAP SE, Walldorf (DE)

(72) Inventors: Michael Kiessle, Malsch (DE); Christof Schmoll, Meckesheim (DE)

(73) Assignee: SAP SE, Walldorf (DE)

( * ) Notice: Subject to any disclaimer, the term of this patent is extended or adjusted under 35 U.S.C. 154(b) by 169 days.

(21) Appl. No.: 15/343,850

(22) Filed: Nov. 4, 2016

(65) Prior Publication Data

US 2018/0129548 A1 May 10, 2018

(51) Int. Cl.
*G06F 11/00* (2006.01)
*G06F 11/30* (2006.01)
*G06F 16/00* (2019.01)
*G06F 16/25* (2019.01)

(52) U.S. Cl.
CPC ......... *G06F 11/004* (2013.01); *G06F 11/006* (2013.01); *G06F 11/30* (2013.01); *G06F 11/3003* (2013.01); *G06F 16/00* (2019.01); *G06F 16/25* (2019.01); *G06F 2201/805* (2013.01)

(58) Field of Classification Search
CPC ...... G06F 11/004; G06F 11/006; G06F 11/07; G06F 11/30; G06F 11/3003; G06F 11/327; G06F 3/0484
See application file for complete search history.

(56) References Cited

U.S. PATENT DOCUMENTS

| | | | | |
|---|---|---|---|---|
| 6,434,547 | B1* | 8/2002 | Mishelevich | G10L 15/26 |
| 8,499,331 | B1* | 7/2013 | Yehuda | H04L 41/5006 |
| | | | | 709/223 |
| 2006/0212486 | A1* | 9/2006 | Kennis | G06F 17/30569 |
| 2010/0174754 | A1* | 7/2010 | B'Far | G06F 17/30507 |
| | | | | 707/794 |
| 2011/0307957 | A1* | 12/2011 | Barcelo | G06F 21/552 |
| | | | | 726/25 |
| 2013/0073715 | A1* | 3/2013 | Whitlock | H04L 12/00 |
| | | | | 709/224 |
| 2013/0339312 | A1* | 12/2013 | Schreter | G06F 16/2308 |
| | | | | 707/687 |
| 2018/0025011 | A1* | 1/2018 | Aksionkin | G06F 17/30085 |

* cited by examiner

*Primary Examiner* — Philip Guyton
(74) *Attorney, Agent, or Firm* — Jones Day

(57) ABSTRACT

Systems and methods are provided for data object validation using multilayer computing environments. A dashboard monitor initiates monitoring of a listener component belonging to a processing center core layer for changes in data objects stored in a data store. The listener component monitors a data maintenance component for changed data objects recorded in a changed objects list stored within the listener component. A daemon framework orchestrates compliance validation of the changed data objects with policies stored in another data store. Compliance of the changed data objects with the policies based on validation rules is validated by a shadow processing component. Real time results associated with the validated compliance are provided to a user interface dashboard.

18 Claims, 4 Drawing Sheets

DATA OBJECT VALIDATION USING MULTILAYER COMPUTING ENVIRONMENTS

TECHNICAL FIELD

The subject matter described herein relates to data object validation using multilayer computing environments.

BACKGROUND

Inaccessibility of data objects during processing leads to complexities with such processing. In cases where data objects are frozen during processing, the data can be inaccessible for editing and/or viewing. Processing of data objects can also require manual reviews by knowledgeable human capital assets, using a variety of computing tools, for any errors within the data objects. Timeframes associated with such processing can depend upon the number of data objects being reviewed in turn making data object accessibility variable.

SUMMARY

In one aspect, a dashboard monitor of a processing center core layer initiates monitoring of a listener component for changes in data objects stored in a data store. The processing center core layer can belong to an in-memory database. The listener component monitors a data maintenance component for the changed data objects. The monitoring can occur for a set time period. The changed data objects are recorded in a changed objects list stored within the listener component. A daemon framework orchestrates compliance validation of the changed data objects with policies stored in another data store. Compliance can be validated on a predetermined regular basis. A shadow processing component validates compliance of the changed data objects with the policies based on validation rules. Real time results associated with the validated compliance are provided to a user interface dashboard. In some variations, the data objects and policies can be associated with payroll services.

A user alert, in some variations, can be provided to the user interface dashboard based on noncompliance of at least one data object with at least one policy. The user alert can propose a resolution to resolve noncompliance of the at least one data object with the at least one policy based on the validation rules.

In another aspect, a system includes at least one data processor and memory storing instructions. Execution of the memory storing instructions result in operations including initiating monitoring, by a dashboard monitor, of a listener component for changes in data objects stored in a data store. The listener components monitors a data maintenance component for the changed data objects. The changed data objects are recorded in a changed objects list stored within the listener component. A daemon framework orchestrates compliance validation of the changed data objects with policies stored in another data store. A shadow processing component validates compliance of the changed data objects with the policies based on validation rules. Real time results associated with the validated compliance are provided to a user interface dashboard.

In yet another aspect, a non-transitory computer readable medium contains program instructions. Execution of the program instructions result in operations including initiating monitoring, by a dashboard monitor, of a listener component for changes in a data objects stored in a data store. The listener component monitors a data maintenance component for the changed data objects. The changed data objects are recorded in a changed objects list stored within the listener component. A daemon framework orchestrates compliance validation of changed data objects with policies stored in another data store. A shadow processing component validates compliance of the changed data objects with the policies based on validation rules. Real time results associated with the validated compliance are provided to a user interface dashboard.

Non-transitory computer program products (i.e., physically embodied computer program products) are also described that store instructions, which when executed by one or more data processors of one or more computing systems, cause at least one data processor to perform operations herein. Similarly, computer systems are also described that can include one or more data processors and memory coupled to the one or more data processors. The memory can temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The subject matter described herein provides many technical advantages. One technical advantage includes providing for accessible data objects during processing periods as well as real time results associated with such processing. Additionally, the review of data objects can be standardized for consistent processing results.

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
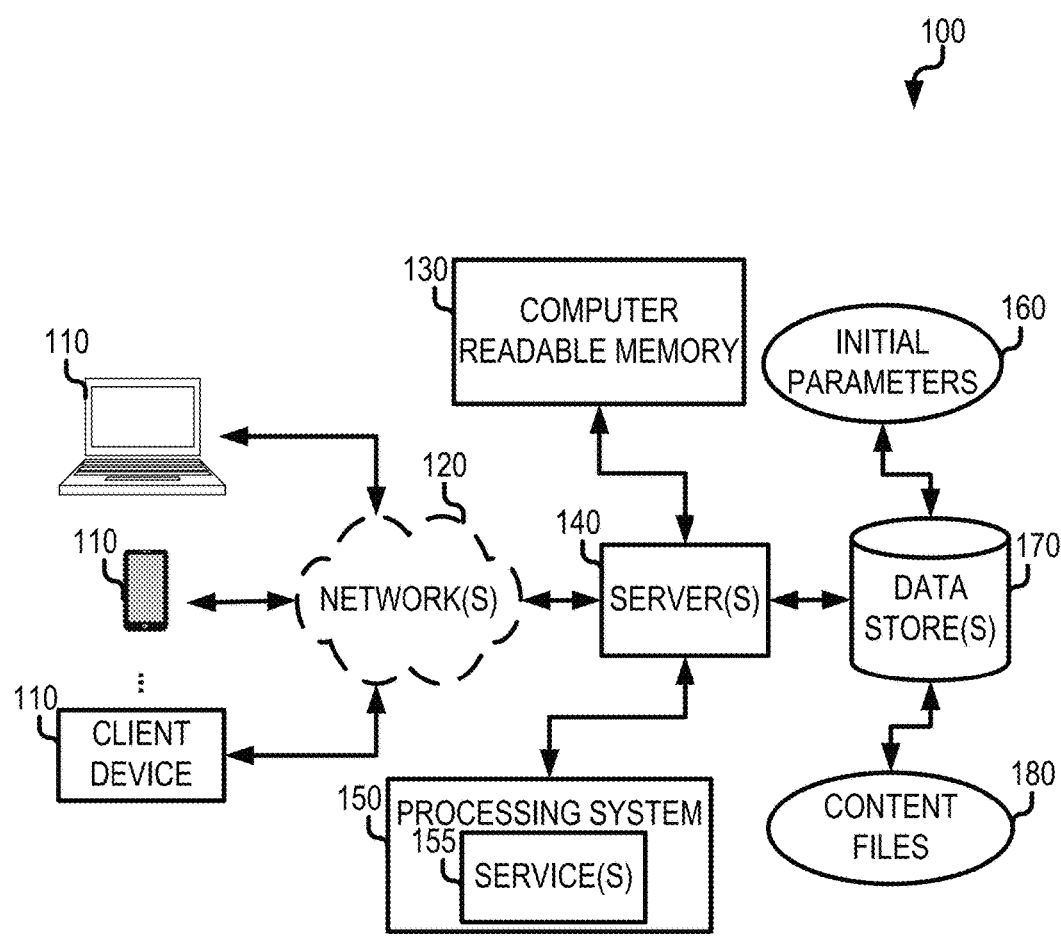
FIG. 1 is a diagrammatic depiction of an example implementation system 100 of a client-server architecture.

FIG. 1 is a diagrammatic depiction of an example implementation system 100 of a client-server architecture. One or more client devices 110 can access one or more servers 140 running one or more services 155 on processing system 150 via one or more networks 120. Alternatively, one or more client devices 110 and one or more servers 140 can be the same computing device eliminating the need for network 120. One or more servers 140 can access computer-readable memory 130 as well as one or more data stores 170. One or more data stores 170 can include initial parameters 160 as well as content files 180.

Figure 2:
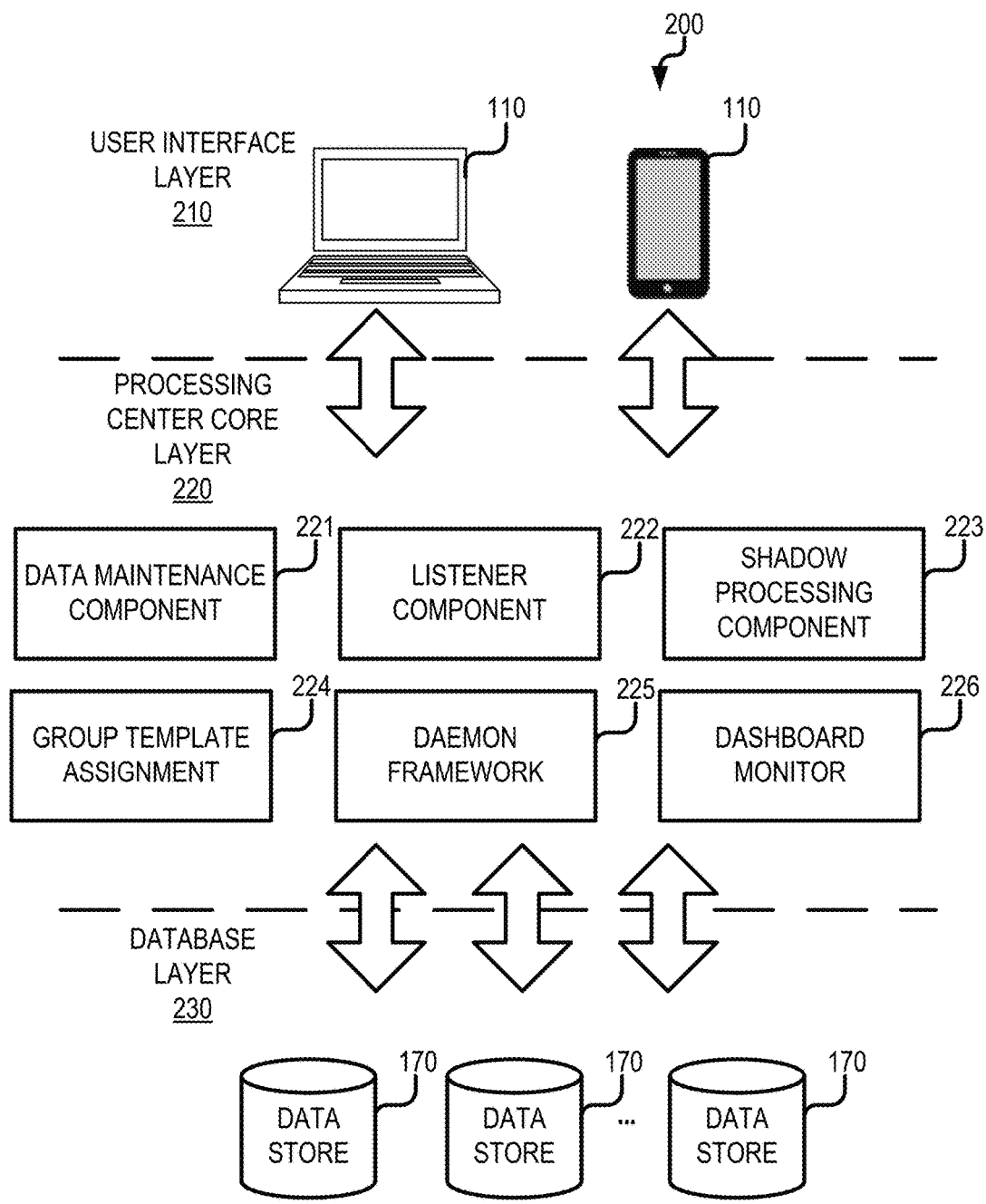
FIG. 2 is an example system architecture for a multilayer computing environment.

FIG. 2 is an example system architecture 200 for a multilayer computing environment. User interface layer 210 can provide data object information to a user via a user interface dashboard. The user interface dashboard can be rendered on a graphical user interface of one or more client devices 110. Real time identification of policy compliance and/or deviations associated with the data objects can be monitored and determined via processing center core layer 220. Processing core layer 220 can be comprised of data maintenance component 221, listener component 222, shadow processing component 223, group template assignment 224, daemon framework 225, and dashboard monitor 226. Compliance can be determined using validation rules comprised of root cause analysis and solutions. The identification of policy compliance and/or deviations can be determined using information regarding policies stored in database layer 230 which can include one or more data stores 170.

The multilayer computing environment can be used for a variety of different applications in which data objects require validation against policy for compliance. In one example, the multilayer computing environment can be used in connection with payroll services. Employee payroll data objects can be dynamically modified with the use of the multilayer computing environment as provided herein. Changes in employee payroll data objects can be monitored and validated for compliance with payroll policies. This can provide for enhanced effectiveness in timely, compliant practices with payroll policies.

Figure 3:
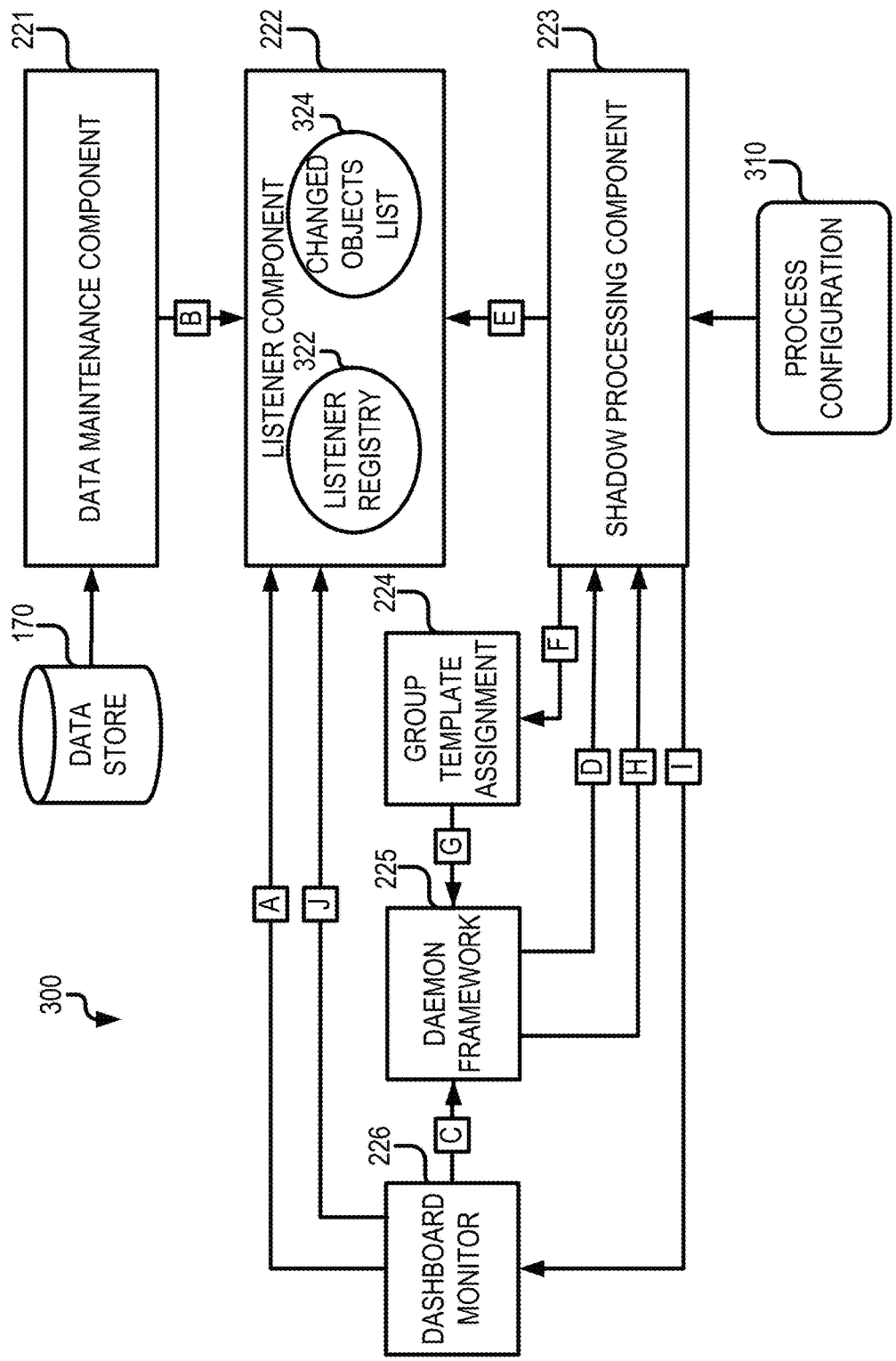
FIG. 3 is a system architecture for a processing center core layer.

FIG. 3 is a system architecture 300 for processing center core layer 220. Dashboard monitor 226 can be started for a time period. Dashboard monitor 226 can transmit request A to start and/or stop listener component 222. Once started, listener component 222 can listen to changes made to data objects within data maintenance component 221 using listener registry 322. Data B associated with changed data objects can be transmitted from data maintenance component 221 to listener component 222. Data maintenance component 221 can interface with at least one data store 170. Changed objects list 324 can maintain tracking of changed objects within listener component 222.

Dashboard monitor 226 can also send request C to daemon framework 225 to validate compliance of data objects with a variety of policies on a regular basis. A regular basis can be a predetermined validation period such as every three hours.

Daemon framework 225 can transmit request D to shadow processing component 223 to process the validation of changed objects with a variety of policies. In return, shadow processing component 223 can send request E to listener component 222 to obtain changed objects list 324 since the last policy validation. Shadow processing component 223 can execute compliance validation of changed objects on changed objects list 324 with a variety of policies by sending request F to group template assignment 224. Execution of compliance validation of shadow processing component 223 can be based on parameters of process configuration 310.

Daemon framework 225 can be informed by group template assignment 224 via notice G once shadow processing component 223 has completed compliance validation. Shadow processing component 223 can be informed via notice H from daemon framework 225 that the validation is completed. In response, shadow processing component 223 can inform dashboard monitor 226 via notice I to update user interface layer 210 with results from the latest policy validation. At the end of the time period, dashboard monitor 226 can transmit request J to stop listener component.

Figure 4:
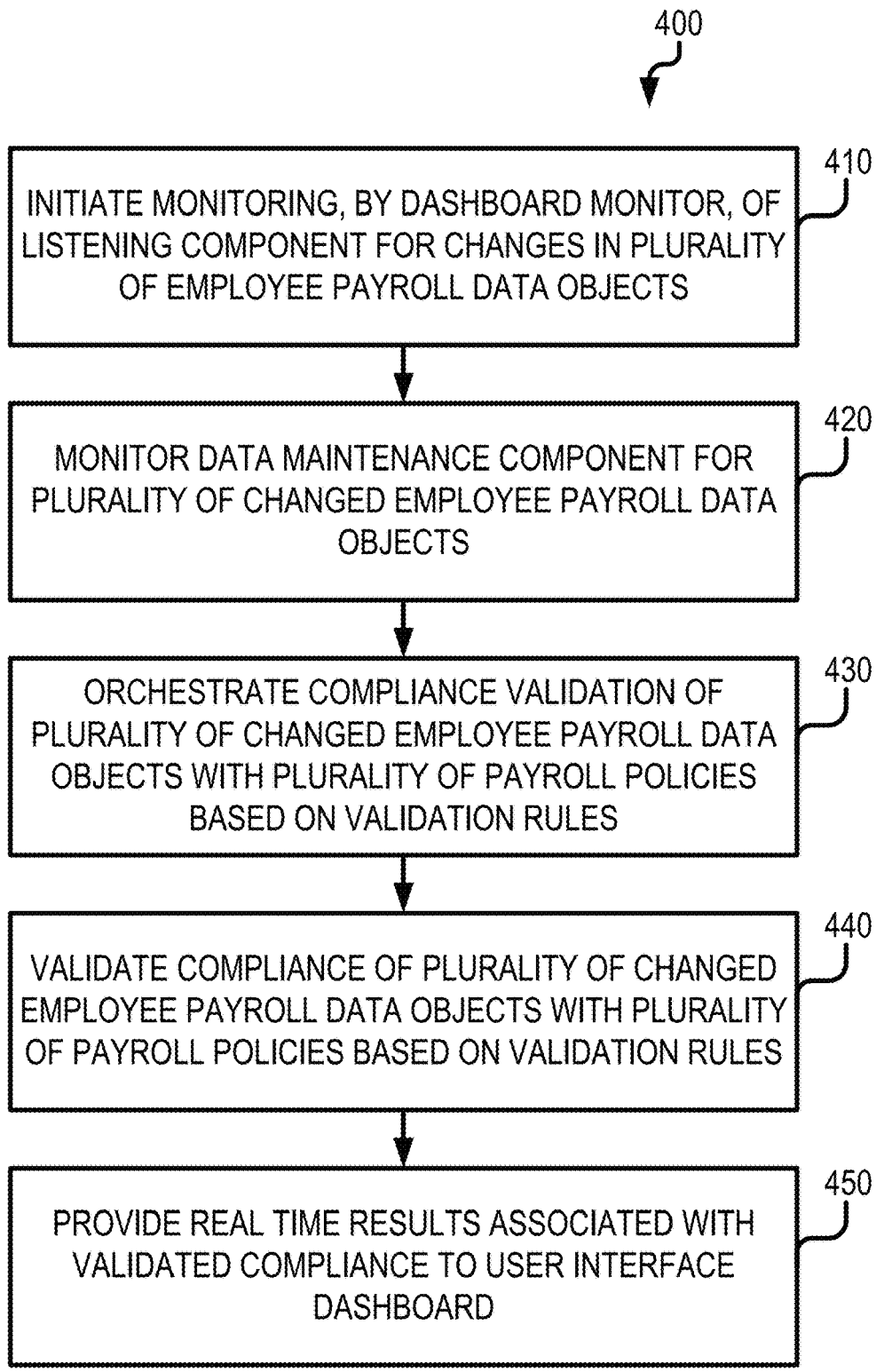
FIG. 4 is a process flow diagram illustrating a processing center core layer.

FIG. 4 is a process flow diagram 400 associated with a processing center core layer 220. Dashboard monitor 226 can initiate monitoring, at 410, of listener component 222 for changes in employee payroll data objects stored in one or more data stores 170. Listener component 222 can monitor, at 420, data maintenance component 221 for changed employee payroll data objects. Daemon framework 225 can orchestrate compliance validation of the changed employee payroll data objects with payroll policies, at 430. Shadow processing component 223 can validate, at 440, compliance of the changed data objects with the payroll policies stored in database layer 230. Real time results associated with the determined compliance of the employee data objects can be provided, at 450, to user interface layer 210. User interface dashboard can be displayed to a user via a graphical user interface of one or more client devices 110.

Non-compliance of an employee payroll data objects with one or more payroll policies can initiate a user alert on the user interface dashboard. This can allow for violations of policies to be provided to a proper user in real time. In another aspect, based on the validation rules, the user alert can propose a resolution to resolve noncompliance between a changed data object and a policy.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system can include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

In the descriptions above and in the claims, phrases such as "at least one of" or "one or more of" can occur followed by a conjunctive list of elements or features. The term "and/or" can also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." In addition, use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A method for implementation within a processing center core layer by one or more data processors forming part of at least one computing device, the method comprising:
   initiating monitoring, by a dashboard monitor, of a listener component of the processing center core layer for changes in a plurality of employee payroll data objects stored in a first data store;
   monitoring, by the listener component for a set time period, of a data maintenance component for the plurality of changed employee payroll data objects, wherein the plurality of changed employee payroll data objects are recorded in a changed objects list stored within the listener component, wherein the dashboard monitor initiates and halts the monitoring of the listener component for the set time period;
   orchestrating, by a daemon framework, compliance validation of the plurality of changed employee payroll data objects with a plurality of payroll policies stored in a second data store;
   validating, by a shadow processing component, compliance of the plurality of changed employee payroll data objects with the plurality of payroll policies based on a plurality of validation rules, wherein validating compliance occurs at a periodic time period; and
   providing real time results associated with the validated compliance to a user interface dashboard.

2. The method according to claim 1, further comprising providing a user alert to the user interface dashboard based on noncompliance of at least one employee payroll data object with at least one payroll policy.

3. The method according to claim 2, wherein the user alert proposes a resolution to resolve noncompliance of the at least one employee payroll data object with the at least one payroll policy based on the plurality validation rules.

4. The method according to claim 1, wherein the processing core layer resides in an in-memory database.

5. The method of claim 1, wherein the dashboard monitor, the listener component, the daemon framework, and the shadow processing component are individual processing elements of the processing center core layer.

6. The method of claim 1, further comprising ceasing the monitoring of the data maintenance component after expiration of the set time period.

7. The method of claim 6, further comprising: reinitiating monitoring of the data maintenance component for another set time period.

8. The method according to claim 1, wherein the data maintenance component is an individual processing elements of the processing center core layer.

9. A system comprising:
   at least one data processor; and
   memory storing instructions, which when executed by at least one data processor, result in operations comprising:
      initiating monitoring, by a dashboard monitor, of a listener component of a processing center core layer of an in-memory database for changes in a plurality of data objects stored in a first data store;
      monitoring, by the listener component for a set time period, of a data maintenance component for the plurality of changed data objects, wherein the plurality of changed data objects are recorded in a changed objects list stored within the listener component, wherein the dashboard monitor initiates and halts the monitoring of the listener component for the set time period;
      orchestrating, by a daemon framework, compliance validation of the plurality of changed data objects with a plurality of policies stored in a second data store;
      validating, by a shadow processing component, compliance of the plurality of changed data objects with the plurality of policies based on a plurality of validation rules, wherein validating compliance occurs at a periodic time period; and
      providing real time results associated with the validated compliance to a user interface dashboard.

10. The system according to claim 9, where execution of the memory storing instructions result in operations further comprising providing a user alert to the user interface dashboard based on noncompliance of at least one data object with at least one policy.

11. The system according to claim 10, wherein the user alert proposes a resolution to resolve noncompliance of the at least one data object with the at least one policy based on the plurality validation rules.

12. The system according to claim 9, wherein the plurality of data objects and the plurality of policies are associated with payroll services.

13. The system according to claim 9, wherein the data maintenance component is an individual processing elements of the processing center core layer.

14. A non-transitory computer readable medium containing program instructions, which when executed by at least one data processor, result in operations comprising:
  initiating monitoring, by a dashboard monitor, of a listener component of a processing center core layer for changes in a plurality of data objects stored in a first data store;
  monitoring, by the listener component for a set time period, of a data maintenance component for the plurality of changed data objects, wherein the plurality of changed data objects are recorded in a changed objects list stored within the listener component, wherein the dashboard monitor initiates and halts the monitoring of the listener component for the set time period;
  orchestrating, by a daemon framework, compliance validation of the plurality of changed data objects with a plurality of policies stored in a second data store;
  validating, by a shadow processing component, compliance of the plurality of changed data objects with the plurality of policies based on a plurality of validation rules, wherein validating compliance occurs at a periodic time period; and
  providing real time results associated with the validated compliance to a user interface dashboard;
  wherein the dashboard monitor, the listener component, the daemon framework, and the shadow processing component are individual processing elements of the processing center core layer and the processing center core layer forms part of an in-memory database.

15. The non-transitory computer readable medium according to claim 14, wherein execution of the program instructions results in operations further comprising providing a user alert to the user interface dashboard based on noncompliance of at least one data object with at least one policy.

16. The non-transitory computer readable medium according to claim 15, wherein the user alert proposes a resolution to resolve noncompliance of the at least one data object with the at least one policy based on the plurality validation rules.

17. The non-transitory computer readable medium according to claim 14, wherein the plurality of data objects and the plurality of policies are associated with payroll services.

18. The non-transitory computer readable medium according to claim 14, wherein the data maintenance component is an individual processing elements of the processing center core layer.

* * * * *